United States Patent [19]

Strain et al.

[11] Patent Number: 4,967,681

[45] Date of Patent: Nov. 6, 1990

[54] SHOCK ABSORBER FOR MOORING CABLES

[75] Inventors: Larry Y. Strain, Louisville; Andrew W. Cannava, Jr., Goshen, both of Ky.

[73] Assignee: American Commercial Marine Service Company, Jeffersonville, Ind.

[21] Appl. No.: 375,941

[22] Filed: Jul. 6, 1989

[51] Int. Cl.$^5$ ............................................. F16G 11/03
[52] U.S. Cl. ...................................... 114/215; 267/70; 267/168; 267/250; 267/290
[58] Field of Search ................. 267/70, 168, 250, 252, 267/290, 291, 292; 16/85; 114/213, 215, 230

[56] References Cited

U.S. PATENT DOCUMENTS

| | | | |
|---|---|---|---|
| 172,479 | 1/1876 | Peters | 267/70 |
| 272,874 | 2/1883 | Fuller | 114/215 |
| 593,788 | 11/1897 | Stone | 267/70 X |
| 608,344 | 8/1898 | Nesmith | 267/72 |
| 624,327 | 5/1899 | Hammond | 267/70 X |
| 629,290 | 7/1899 | Goodbaudy | 267/70 X |
| 2,164,709 | 7/1939 | Hall et al. | 267/70 |
| 2,663,534 | 12/1953 | Hinckle | 267/70 X |

FOREIGN PATENT DOCUMENTS 678 of 1879 United Kingdom ................. 114/213

Primary Examiner—George E. A. Halvosa
Attorney, Agent, or Firm—Laurence R. Brown

[57] ABSTRACT

A shock absorber for use in connection with moored barge fleets, and capable of withstanding very large shock loads so that when positioned between a mooring cable and a stationary shore connection the shock absorber absorbs impact loads that are applied to the mooring cable by virtue of the flow of the current and the passage of other vessels. The shock absorber includes a cylindrical outer shell, the shell including end closure plates at each end. Extending between the end closure plates are six guide rods, each guide rod carrying four aligned groups of two concentric helical compression springs, the respective groups of springs being separated from axially adjacent groups of springs by respective alignment plates that are freely movable relative to the guide rods. A drawbar extends from the interior of the shell, and one end includes an end support plate that is secured to the drawbar and that is also slidably carried on the guide rods, the opposite end of the drawbar extending outwardly from one of the end closure plates and slidably received in a slot formed in the end closure plate. The drawbar terminates in a connection bore, and a connection tab also in the connection bore is provided on the outer face of the opposite end closure plate to permit the attachment to the shock absorber of portions of mooring cables.

2 Claims, 2 Drawing Sheets

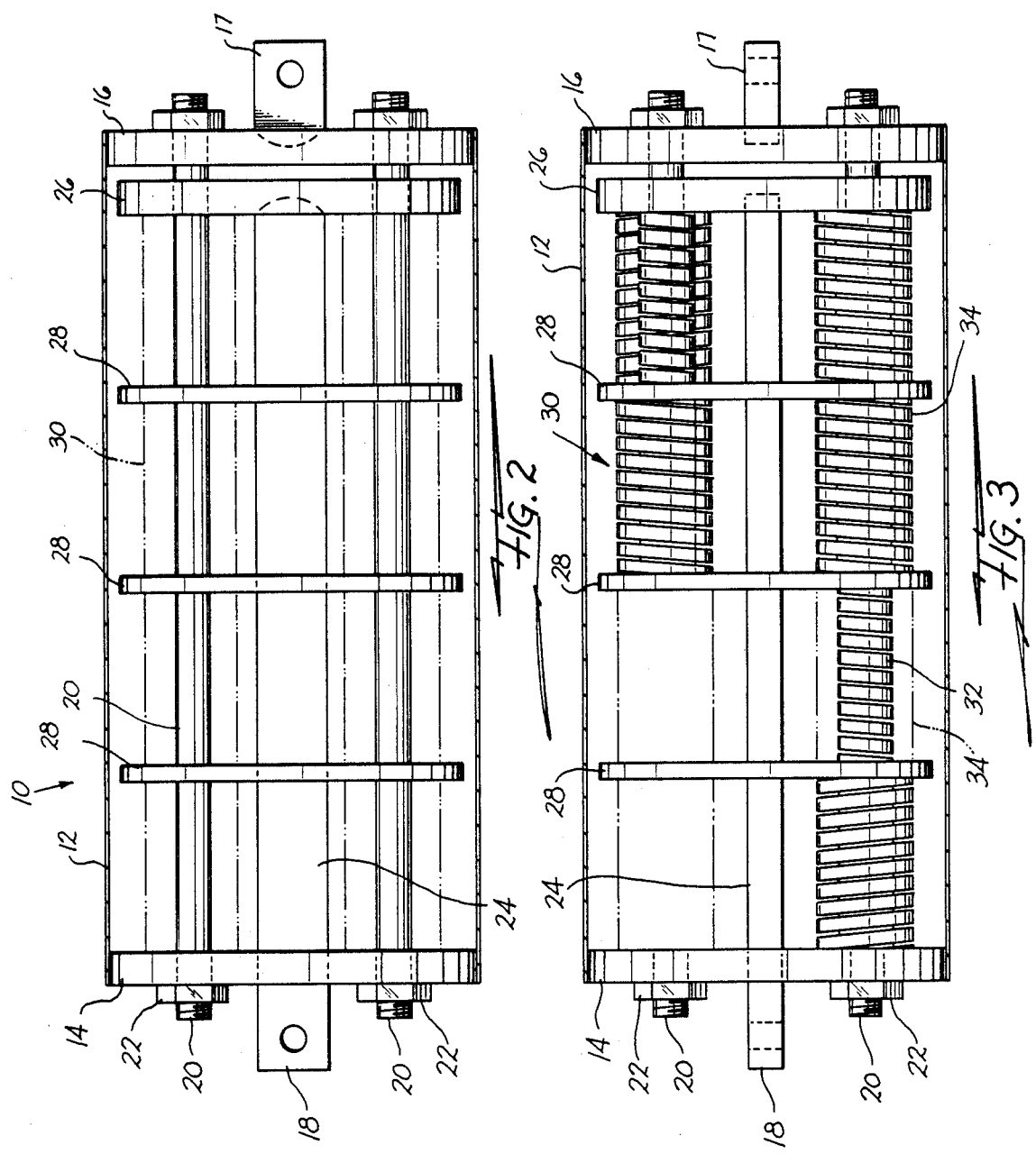

4,967,681

SHOCK ABSORBER FOR MOORING CABLES

BACKGROUND OF THE INVENTION

1. Field of the Invention

This invention relates to a shock absorber device for preventing breakage of cables and the like resulting from the application of impact loads, and more particularly to a shock absorber adapted to be connected with a morring cable that is, in turn, connected with a vessel that is moored to a dock, or a cable that connects a towing vessel and a towed vessel.

2. Description of the Related Art

Marine vessels are typically moored to a dock or to some fixed object rigidly positioned on a shoreline or on a shore-based structure by means of heavy cables that are intended to withstand the tensile loads that result when the vessel is drawn in a downstream direction by virtue of the flow of a current or the action of waves from passing vessels. In the case of heavy vessels, such as groups of barges that are interconnected to be pushed along a river as a barge fleet by a tow boat, when the barge fleet is moored to the bank, the mooring cables, which oftentimes are large diameter steel cables, have a tendency to break when high loads are applied suddenly, as sometimes results when a riverboat passes close by. Under such conditions, the passing boat causes wave action that, in turn, sometimes causes the moored barge fleet to move upriver for a short distance, against the flow of the current. As a result, the mooring cables become slack, and after the passing riverboat is far enough away, and the effects of its passage have dissipated, the flowing current carries the barge fleet along with it.

When the movement of the fleet in a downstream direction has been sufficient to take up the slack in the mooring cable there is a sudden application of a very high tensile load in the mooring cable caused by the cable having to withstand and absorb the impact load resulting from the momentum of the moving barge fleet. Depending upon the weight of the barges and their contents, and also dependent upon the velocity of the fleet of barges, the sudden application of a high tensile load to the mooring cables frequently causes the cables to break, resulting in the fleet of barges being carried downstream in an uncontrolled manner, possibly causing damage when the barges collide with other barges or vessels that might be moored nearby on the downstream side. Additionally, even if the mooring cables do not initially break, repeated application of such impact loads gradually stretches and weakens the cables so that ultimately a failure occurs.

Various types of shock absorber structures have been suggested in the past for absorbing shock loads in anchor cables, but those devices have been intended for use with small vessels, and not with large fleets of interconnected barges. For example, in U.S. Pat. No. 593,788, which issued Nov. 16, 1897, to J.B. Stone, there is disclosed a shock absorber in the form of a pair of coaxial springs that are positioned within a sealed housing that contains oil, the flow of which is controlled by the size of apertures formed in a piston-type head to resist and limit the rate of travel of the spring assembly and thereby absorb shock loads.

Examples of other shock absorber constructions adapted for nautical use are shown in U.S. Pat. No. 608,344, which issued Aug. 2, 1898, to F.P. Nesmith; U.S. Pat. No. 869,130, which issued Oct. 22, 1907, to F.A. Bierie; and U.S. Pat. No. 4,754.957, which issued Jul. 5, 1988, to V.H. Muttart. However,p in each case, the shock absorbers disclosed in those patents are intended for small vessels, and would be unsatisfactory for use with heavy fleets of barges, which generate very high impact loads in mooring cables.

Accordingly, it is an object of the present invention to provide an improved shock absorber structure for use with mooring cables for heavy vessels, in order to avoid the imposition on the cables of sudden impact loads that would otherwise break the mooring cables.

SUMMARY OF THE INVENTION

Briefly stated, in accordance with one aspect of the present invention, a shock absorber is provided for attenuating impact loads applied to vessel mooring cables and the like. The shock absorber includes a housing that is defined by an elongated, hollow shell having a longitudinal axis and including a pair of longitudinally spaced end closure plates. One of the end closure plates includes an exteriorly positioned connector tab that is secured thereto and that has an aperture to receive a first cable mounting. The other end closure includes a substantially centrally positioned aperture to slidably receive an elongated drawbar that extends outwardly through the end closure aperture and terminates in an outer end to define a second connector tab that also includes an aperture to receive a cable mounting. The drawbar extends into the interior of the housing and has an interiorly positioned end support plate secured thereto.

A plurality of guide rods are disposed within the housing in substantially parallel relationship with the housing axis and have their respective axes arranged around the housing axis. A plurality of individual compression springs surrounds each of the guide rods between the drawbar end support plate and the second end closure of the housing. Additionally, a plurality of axially spaced alignment plates that extend transversely of the housing axis are provided for separating adjacent springs. The alignment plates are free floating, in that they include apertures to permit sliding of the alignment plates relative to the guide rods and relative to the drawbar to provide a plurality of floating spring separators.

The springs are deflectable to absorb tensile loads that are imposed on cables attached to the connector tabs and serve to slow the outward movement of the drawbar when sudden loads are applied to the shock absorber through the cables.

BRIEF DESCRIPTION OF THE DRAWINGS

FIG. 2 is a top schematic view, of the shock absorber shown in FIG. 1 showing structure inside the outer cylindrical shell.

FIG. 3 is a view similar to FIG. 2, wherein the shock absorber has been rotated about its own axis by 90°, and showing the arrangement of the various springs within the shock absorber housing.

DESCRIPTION OF THE PREFERRED EMBODIMENTS

Figure 1:
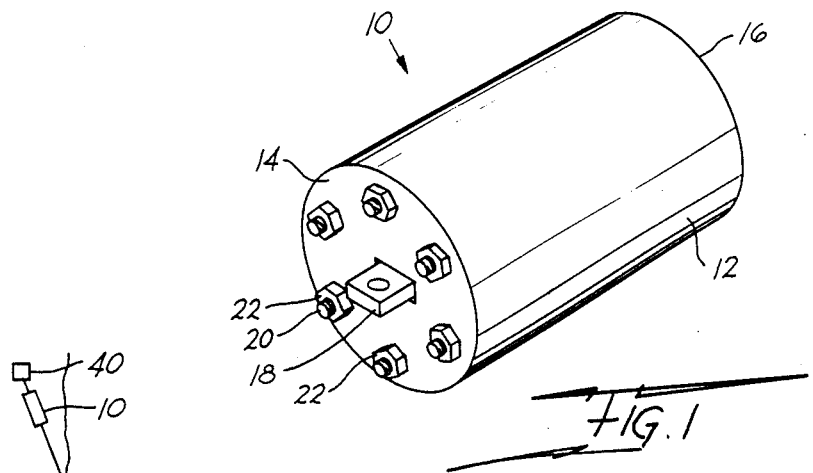
FIG. 1 is a perspective view of a mooring cable shock absorber in accordance with the present invention.

Referring now to the drawings, and particularly to FIG. 1 thereof, there is shown a shock absorber 10, including an outer cylindrical shell 12, to one end of which is secured a first end wall 14, and to the other end of which is secured a second end wall 16. End walls 14 and 16 can be secured to the outer shell by any convenient means, such as by welding the shell to the end walls, or, alternatively, by means of a shrink fit whereby the shell is first heated to expand it and to permit it to fit over the end walls, whereupon the shell is cooled so that it shrinks to tightly engage the outer circumferential ends of the end walls.

Extending outwardly from first end wall 14 is a first connector tab 18, and a pluralilty of circularly disposed guide rods 20 that each threadedly, carry respective nuts 22 at their outermost ends. As best seen in FIGS. 2 and 3, guid rods 20 extend between and through each of first and second end walls 14. 16, and are restrained at each end by the respective nuts 22 so that they are fixed in an axial position, relative to the axis of shell 12. First connector tab 18 is the outward extension through end wall 14 of an elongated, substantially rectangular drawbar 24 that terminates interiorly of shell 12 is a transversely positioned end support plate 26 that has substantilly the same cross-sectional configuration as that of shell 12, but that also has a smaller outer diameter. Preferably, the innermost end of drawbar 24 is welded to end support plate 26 to provide a rigid connection capable of withstanding extremely large loads. End support plate 26 includes a plurality of circularly arranged apertures to permit guide rods 20 to pass therethrough, and the apertures are of such a size, relative to the outer diameter of guide rods 20 to permit free movement of end support plate 26 in a direction parallel with the longitudinal axis of shell 12.

Also positioned interiorly of shell 12, and between first end closure plate 14 and the interiorly-positioned end support plate 26 are a plurality of axially spaced alignment plates 28 that, like end support plate 26, also have an overall configuration that corresponds with the cross-sectional configuration of shell 12, but have an outer dimension that is less than the inner dimension of shell 12, in order to permit alignment plates 28 to be movable relative thereto.

Figure 4:
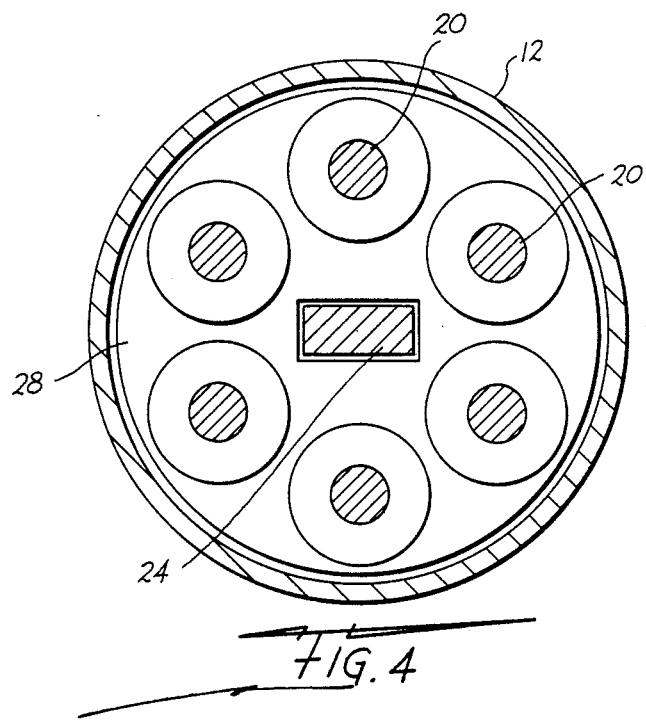
FIG. 4 is a cross-sectional schematic view of FIGS. 2 or 3.

As best seen in FIG. 4, alignment plates 28 each include a plurality of apertures to permit the passage therethrough of respective ones of guide rods 20, the apertures being sufficiently larger than the outer diameter of guide rods 20 to permit the respective alignment plates 28 to be freely moveable therealong. In addition, a substantially centrally positioned slot is provided in the respective alignment plates 28, corresponding in cross section and slightly larger than the cross section of drawbar 24, to also permit each of alignment plates 28 to be slidably movable relative to drawbar 24.

Referring once again to FIGS. 2 and 3, positioned between each of alignment plates 28, and between one endmost alignment plate and end support plate 26 on the one hand, and between the other endmost alignment plate and first end closure plate 14 on the other hand, are a plurality of helical compression springs 30 that serve to absorb shock loads that are applied to shock absorber 10 when it is in use. Between each of alignment plates 28 and surrounding each of guide rods 20 is a pair of concentric springs, including an inner spring 32 and an outer spring 34, the latter having an iner diameter greater than that of a respective inner spring to permit independent movement of each of the respective springs. Thus, extending, between each of the respective end and alignment plates are two springs for each guide rod, or in the configuration shown in the drawings, in which six guide rods are provided, a total of 12 springs is provided, including six inner springs 32 and six outer springs 34, the inner and outer springs bring provided in six groups of concentrically disposed springs 30.

In one particularly suitable form of the present invention for use with fleets of interconnected barges, the outer diameter of outer cylindrical shell 12 can be about 21 inches, guide rods 20 can be 2 inch steel bars, end closure plates 14, 16 can be 2 inches thick, and alignment plates 28 can be one inch thick with a 19.5 inch outer diameter. Similarly, end support plate 26 can also be a 2 inch thick plate having an outer diameter of 19.5 inches. The smaller, inner springs 32 can be 10 inch by 3.5 inch steel springs having a 2.25 inch inner diameter, and the larger, outer springs 34 can be 10 inch by 5.5 inch steel springs having a 4 inch iner diamter. Drawbar 24 can be a steel bar having a length of 51 inches, a width of 6 inches, and a depth of 2 inches, and second connector tab 17 can be a steel bar having a length of 10 inches, a width of 10 inches, and a depth of 2 inches. First connector tab 18 at the outermost end of drawbar 24 and second connector tab 17 extending outwardly from second end closure plate 16 each preferably has a 2.5 inch hole extending therethrough to accept a 35 ton shackle.

Figure 5:
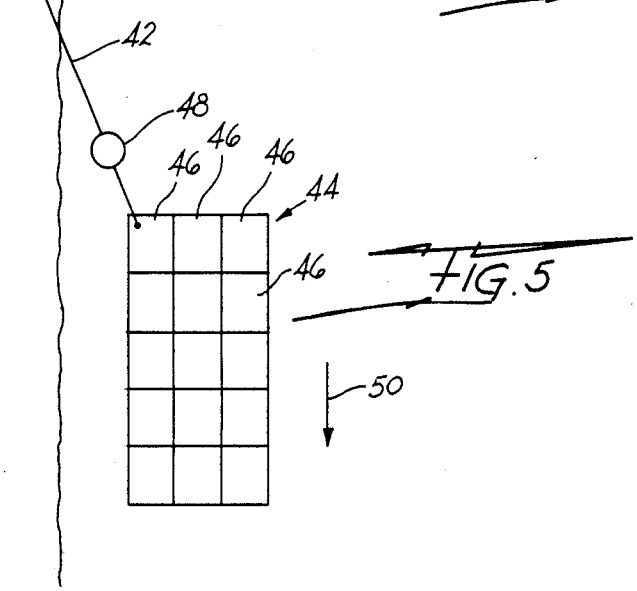
FIG. 5 is a fragmentary plan view showing one way in which the shock absorber in accordance with the present invention can be used to reduce breakage of mooring cables used for mooring a fleet of interconnected barges to a riverbank.

In use, and referring now to FIG. 5, a shore anchor point 40 is provided, which can be in the form of a so-called concrete deadman that is embedded into the earth adjacent to the shoreline. The deadman includes a shackle or other suitable connector that is adapted to be connected with one end of shock absorber 10. The other end of shock absorber 10 is connected by another shackle or other suitable connector with a steel cable 42 that extends from shock absorber 10 to the end of one of a barge fleet 44 formed by a plurality of interconnected barges 46. The connection of cable 42 is preferably made with the barge on the upstream side of the fleet 44, and on the side adjacent to the shoreline to which the cable is connected. A shore wire float 48 can be provided, if desired.

Consequently, if a riverboat passes near barge fleet 44 in an upstream direction and causes upstream movement of the fleet, cable 42 becomes slack, and when the passing riverboat has moved upstream and the effect of its passage has dissipated, the current flowing in the direction shown by arrow 50 in FIG. 5 pushes barge fleet 44 in a downstream direction. Therefore, the fleet attains a velocity in a downstream direction, the velocity being equal to or less than the velocity of the current, and that fleet velocity is dependent upon the distance it was carried upstream by the action of the passing riverboat and the velocity of the flowing current.

When barge fleet 44 has moved downstream a sufficient distance to take up the slack in cable 42 there results a very sudden application to the cable of an impact load, and that impact load is absorbed by shock absorber 10, so that the load is applied in a gradual manner, rather than in a sudden manner, thereby reducing the incidence of broken mooring cables.

Although particular embodiments of the present invention have been illustrated and described, it will be apparent to those skilled in the art that various changes and modifications can be made without departing from the spirit of the present invention. Accordingly, it is intended to encompass in the appended claims all such changes and modifications that fall within the scope of the present invention.

What is claimed is:

1. A shock absorber system for mooring cables of heavy marine vessels including barge fleets for absorbing high tensile loads such as incurred by a moored vessel from waves from passing vessels that induce sudden high tensile loads in the mooring cables, said shock absorber system comprising in combination, a shock absorber housing defined by an elongated hollow shell having a longitudinal axis and including a pair of longitudinally spaced end closure plates of which one is adapted for coupling in a mooring cable connecting mooring one of said vessels to a dock, and the other of which is provided with a centrally positioned aperture, elongated drawbar means extending through the aperture for longitudinal motion therethrough adapted for coupling in said mooring cable connection and having positioned within the housing an end support plate adapted to move longitudinally with said drawbar means within said housing shell secured thereto at a position remote from said end closure plate with the aperture, a plurality of guide rods secured to the end plates in a substantially parallel relationship with the housing axis and arranged about the housing axis, a plurality of apertured alignment plates freely movable on the drawbar means and the guide rods longitudinally within said shell, spring means disposed in air within the housing including concentric inner and outer coil springs independently movable arranged for longitudinal movement on each of the guide bars and confined respectively in a plurality of longitudinally spaced spring sets disposed between two respective plates of the alignment plates, support plate and apertured end plate in substantially non-compressed normal condition in the absence of tension caused by displacement of the drawbar means from normal condition and arranged to be compressed in unison by displacement at the drawbar means, wherein the spring means by compression of the coil springs disposed in air within said housing incurred by movement of the drawbar means relative to the housing from forces of a magnitude that absorb tensile loads imposed upon mooring cables coupled to the shock absorber system by way of the housing and drawbar means prevent stretching and breaking of the mooring cables when securing a heavy marine vessel floating upon a body of water to a dock in the presence of waves that produce impact loads from movements of the vellel in the water.

2. The shock absorber system defined in claim 1 connected between a fleet of intercoupled barges disposed in a flowing body of water to a dock positioned upstream from the barges.

* * * * *